United States Patent
Giraldo et al.

(10) Patent No.: US 10,263,724 B2
(45) Date of Patent: Apr. 16, 2019

(54) WAVELENGTH-DIVISION MULTIPLEXING USING SHARED PROCESS INFORMATION

(71) Applicant: Roshmere, Inc., San Diego, CA (US)

(72) Inventors: Eduardo Temprana Giraldo, La Jolla, CA (US); Nikola Alic, La Jolla, CA (US)

(73) Assignee: Roshmere, Inc., San Diego, CA (US)

( * ) Notice: Subject to any disclaimer, the term of this patent is extended or adjusted under 35 U.S.C. 154(b) by 0 days.

(21) Appl. No.: 15/877,744

(22) Filed: Jan. 23, 2018

(65) Prior Publication Data

US 2018/0219645 A1    Aug. 2, 2018

Related U.S. Application Data

(60) Provisional application No. 62/451,980, filed on Jan. 30, 2017.

(51) Int. Cl.
*H04B 10/50* (2013.01)
*H04J 14/02* (2006.01)

(52) U.S. Cl.
CPC ........ *H04J 14/0227* (2013.01); *H04B 10/506* (2013.01); *H04J 14/0256* (2013.01); *H04J 14/0278* (2013.01)

(58) Field of Classification Search
CPC ..... H04J 14/0227; H04J 14/0278; H04J 14/02
USPC .......................................................... 398/79
See application file for complete search history.

(56) References Cited

U.S. PATENT DOCUMENTS

| 4,950,880 | A  | * | 8/1990  | Hayner   | G01S 7/497 |
|           |    |   |         |          | 250/201.9  |
| 6,671,298 | B1 | * | 12/2003 | Delfyett | H01S 5/14  |
|           |    |   |         |          | 372/26     |
| 7,558,556 | B1 | * | 7/2009  | Moloudi  | H04B 1/40  |
|           |    |   |         |          | 323/267    |
| 7,894,725 | B2 | * | 2/2011  | Holman   | H04B 10/508|
|           |    |   |         |          | 398/183    |
| 8,103,166 | B2 | * | 1/2012  | Liu      | H04B 10/61 |
|           |    |   |         |          | 398/43     |

(Continued)

FOREIGN PATENT DOCUMENTS

EP    2634935 B1    9/2014

OTHER PUBLICATIONS

International Search Report dated May 30, 2018 for PCT Patent Application Nu. PCT/US2018/014849.

*Primary Examiner* — Kenneth N Vanderpuye
*Assistant Examiner* — Abbas H Alagheband
(74) *Attorney, Agent, or Firm* — The Mueller Law Office, P.C.

(57) ABSTRACT

In an improved wavelength-division multiplexed system, transmitters modulate carrier signals that are phase or frequency correlated with each other. Receivers retrieve transmission data from the modulated carrier signals by demodulating and equalizing the modulated carrier signals using oscillating signals that are also phase or frequency correlated with each other. Each oscillating signal has a wavelength that matches a wavelength of a corresponding one of the carrier signals. At least one of the receivers generates process information during the demodulating and equalizing. The process information is sent to at least one other receiver, which uses the process information to retrieve at least a portion of the transmission data.

28 Claims, 7 Drawing Sheets

(56) References Cited

U.S. PATENT DOCUMENTS

| | | | |
|---|---|---|---|
| 8,498,542 B2* | 7/2013 | Frankel | H04B 10/5053 398/184 |
| 8,543,882 B2* | 9/2013 | Cai | H04L 1/0047 714/752 |
| 8,618,966 B2* | 12/2013 | Kanter | G02F 7/00 341/137 |
| 8,699,882 B2* | 4/2014 | Shieh | H04L 25/0224 398/152 |
| 8,787,767 B2* | 7/2014 | Wilkinson | H04B 10/548 398/140 |
| 8,849,119 B2* | 9/2014 | Jeong | H04J 14/0282 398/135 |
| 9,515,767 B2* | 12/2016 | Frankel | H04B 10/5053 |
| 9,912,409 B2* | 3/2018 | Jia | H04B 10/506 |
| 2008/0212974 A1* | 9/2008 | Davies | H04B 10/2575 398/140 |
| 2009/0087186 A1* | 4/2009 | Holman | H04B 10/508 398/102 |
| 2009/0279098 A1* | 11/2009 | Ohbayashi | A61B 5/0066 356/478 |
| 2009/0297140 A1* | 12/2009 | Heismann | G01M 11/333 398/16 |
| 2010/0021166 A1* | 1/2010 | Way | H04J 14/02 398/79 |
| 2010/0178056 A1* | 7/2010 | Liu | H04B 10/61 398/65 |
| 2010/0178057 A1* | 7/2010 | Shieh | H04L 25/0224 398/79 |
| 2011/0097075 A1* | 4/2011 | Tanimura | H04B 10/07953 398/1 |
| 2011/0176815 A1* | 7/2011 | Frankel | H04B 10/5053 398/184 |
| 2013/0028595 A1* | 1/2013 | Nakagawa | H04L 27/2657 398/25 |
| 2013/0188952 A1 | 7/2013 | Peach et al. | |
| 2013/0209098 A1 | 8/2013 | Huang et al. | |
| 2013/0209105 A1* | 8/2013 | Jeong | H04J 14/0282 398/72 |
| 2013/0272456 A1* | 10/2013 | Hayami | H03M 13/112 375/340 |
| 2013/0287398 A1* | 10/2013 | Frankel | H04B 10/5053 398/65 |
| 2013/0315269 A1* | 11/2013 | Liu | H01S 5/06256 372/20 |
| 2014/0010532 A1* | 1/2014 | Zhang | H04B 10/0779 398/25 |
| 2014/0161443 A1 | 6/2014 | Zhou | |
| 2015/0043919 A1* | 2/2015 | Handelman | H04J 14/02 398/79 |
| 2015/0323781 A1* | 11/2015 | Schneider | G02B 26/06 359/238 |
| 2016/0028487 A1 | 1/2016 | Kan et al. | |
| 2017/0019178 A1 | 1/2017 | Alic et al. | |
| 2017/0023663 A1* | 1/2017 | Subburaj | G01S 7/40 |
| 2017/0294966 A1* | 10/2017 | Jia | H04B 10/506 |

* cited by examiner

WAVELENGTH-DIVISION MULTIPLEXING USING SHARED PROCESS INFORMATION

RELATED APPLICATIONS

The application claims the benefit of U.S. Provisional Patent Application No. 62/451,980 filed on Jan. 30, 2017, and entitled "WAVELENGTH-DIVISION MUTIPLEXING USING SHARED PROCESS INFORMATION;" which is hereby incorporated by reference for all purposes.

BACKGROUND OF THE INVENTION

Transmission of high-bandwidth information (e.g., greater than 20 THz) using wavelength-division multiplexing (WDM) systems is accomplished by dividing the wide-bandwidth into multiple lower-bandwidth WDM information channels (e.g., 50 GHz). The multiple lower-bandwidth WDM information channels are combined and then transmitted using the available bandwidth of the WDM system.

Traditionally, WDM modems (which include WDM information channel transmitters and WDM information channel receivers) operate completely independently from one information channel to another. This mode of operation was prompted by the reliance on oscillators (e.g., lasers) of poor quality (e.g., with poor phase stability, or a high degree of phase noise), making inherent phase and frequency tracking a complex task. WDM systems use carrier signals that include, but are not limited to: optical carrier signals, electrical carrier signals and radio-frequency (RF) carrier signals.

Each of the information channels of an optical WDM system relies on an optical emitter (e.g., a laser) that produces a carrier signal, onto which information is imprinted in a process called modulation (of the carrier signal) to produce modulated carrier signals. Transmission of a modulated carrier signal though an information channel over a transmission link of the WDM system unavoidably incurs impairments (e.g., chromatic dispersion, attenuation and other distortions) on the transmitted modulated carrier signal. Significant and sophisticated digital signal processing is performed at a WDM receiver to retrieve, or acquire, the information at the receiving end of the transmission link.

Independent laser emitters are typically used to generate the carrier signals in optical WDM systems. Being altogether independent devices, the properties of the underlying carrier signals for each information channel are not only distinct, but also vary independently and randomly over time. To successfully perform information retrieval, an independent WDM receiver is typically used for each information channel. In such systems, signal processing blocks of each WDM receiver are replicated and run independently. Even though each of the WDM receivers replicate the same signal processing chain, each of the WDM receivers may possibly arrive at different outcomes.

Thus, while there are numerous solutions for digital signal processing in coherent optical transmission systems, these solutions fail to meet the needs of the industry because the solutions replicate all or a portion of the same processing steps for each information channel (e.g., wavelength).

Some solutions attempt to merge processing of two or more information channels onto a single line card. However, processing for the two or more information channels is still performed independently, resulting in the same total complexity and power dissipation as the sum of processing for the independent information channels.

SUMMARY OF INVENTION

In some embodiments, a wavelength-division multiplexed system is disclosed that provides for simplified information channel processing which thereby reduces processing complexity, redundancy and power consumption.

The wavelength-division multiplexed system includes a transmission portion. The transmission portion includes carrier signal emitters that produce carrier signals at different wavelengths and that are phase or frequency correlated with each other. The transmission portion also includes transmitters. Each of the transmitters is connected to a corresponding one of the carrier emitters to receive a corresponding carrier signal therefrom. Each of the transmitters modulates the received carrier signal with transmission data to form a modulated carrier signal. The transmission portion also includes a wavelength-division multiplexer connected to the transmitters to receive the modulated carrier signals and to combine the modulated carrier signals for transmission through a transmission link. The wavelength-division multiplexed system also includes a reception portion. The reception portion includes a wavelength-division de-multiplexer that receives the modulated carrier signals from the transmission link, separates the modulated carrier signals into individual modulated carrier signals and passes each of the separated modulated carrier signals to a respective receiver. The reception portion also includes oscillators that produce oscillating signals at different wavelengths and that are phase or frequency correlated with each other. Each of the oscillating signals has a wavelength that matches (or is close to) a wavelength of a corresponding one of the carrier signals. The reception portion also includes receivers. Each of the receivers is connected to the wavelength-division de-multiplexer to receive one of the modulated carrier signals. Each of the receivers is connected to a corresponding one of the oscillators to receive a corresponding oscillating signal therefrom. Each of the receivers is connected to at least one other receiver to send or receive process information. The process information can include at least one of 1) an estimated carrier signal phase offset, 2) an estimated carrier signal frequency offset, 3) an estimated accumulated chromatic dispersion, and 4) demodulated symbol information. Each receiver that receives the process information uses the received modulated carrier signal, the received oscillating signal, and the received process information to retrieve at least a portion of the transmission data.

In some embodiments, the receivers of the wavelength-division multiplexed system include master receivers that generate and send the process information, and slave receivers that receive the process information and are not capable of generating the process information.

In some embodiments, one or more systems carry out one or more steps of a method that involves modulating, by transmitters, carrier signals with transmission data to form modulated carrier signals. The carrier signals have different wavelengths and are phase or frequency correlated with each other. The method also involves steps of retrieving, by receivers, the transmission data by demodulating and equalizing the modulated carrier signals using oscillating signals that have different wavelengths and are phase or frequency correlated with each other, each oscillating signal having a wavelength that matches (or is close to) a wavelength of a corresponding one of the carrier signals. The method also involves steps of generating, by at least one of the receivers during the demodulating and equalizing, process information. The process information can include at least one of 1) an estimated carrier signal phase offset, 2) an estimated carrier signal frequency offset, 3) an estimated accumulated chromatic dispersion, and 4) demodulated symbol information. The method also involves steps of sending, by the at least one of the receivers to at least one other receiver, the process information. The method also involves using, by the at least one other receiver during the demodulating and equalizing, the process information to retrieve at least a portion of the transmission data.

In some embodiments, the at least one of the receivers is a master receiver that generates the process information, and the at least one other receiver is a slave receiver that cannot generate the process information.

In some embodiments, a frequency-division multiplexed system is disclosed that provides for simplified information channel processing, which thereby reduces processing complexity, redundancy and power consumption.

The frequency-division multiplexed system includes a transmission portion. The transmission portion includes carrier signal emitters that produce carrier signals at different frequencies and that are phase or frequency correlated with each other. The transmission portion also includes transmitters. Each of the transmitters is connected to a corresponding one of the carrier emitters to receive a corresponding carrier signal therefrom. Each of the transmitters modulates the received carrier signal with transmission data to form a modulated carrier signal. The transmission portion also includes a frequency-division multiplexer connected to the transmitters to receive the modulated carrier signals and to combine the modulated carrier signals for transmission through a transmission link. The frequency-division multiplexed system also includes a reception portion. The reception portion includes a frequency-division de-multiplexer that receives the modulated carrier signals from the transmission link, separates the modulated carrier signals into individual modulated carrier signals and passes each of the separated modulated carrier signals to a respective receiver. The reception portion also includes oscillators that produce oscillating signals at different frequencies and that are phase or frequency correlated with each other. Each of the oscillating signals has a frequency that matches (or is close to) a frequency of a corresponding one of the carrier signals. The reception portion also includes receivers. Each of the receivers is connected to the frequency-division de-multiplexer to receive one of the modulated carrier signals. Each of the receivers is connected to a corresponding one of the oscillators to receive a corresponding oscillating signal therefrom. Each of the receivers is connected to at least one other receiver to send or receive process information. The process information can include at least one of 1) an estimated carrier signal phase offset, 2) an estimated carrier signal frequency offset, 3) an estimated accumulated chromatic dispersion, and 4) demodulated symbol information. Each receiver that receives the process information uses the received modulated carrier signal, the received oscillating signal, and the received process information to retrieve at least a portion of the transmission data.

In some embodiments, the receivers of the frequency-division multiplexed system include master receivers that generate and send the process information, and slave receivers that receive the process information and are not capable of generating the process information.

In accordance with some embodiments, the term connected means an electrical connection. In accordance with some embodiments, the term connected means an optical connection. In accordance with some embodiments, the term connected means an RF connection. Two or more devices, blocks, or circuit nodes are connected if the information content of a signal received at the first device or circuit node is fully preserved from one end of the connecting path to the other absent a change in the power supply. For example, buffers, amplifiers, level shifters, or an inverter can be placed on the connecting path between two elements, but those two elements are still connected because the interconnecting circuitry and or modules do not alter the information content of the signal. One device serves to connect two other objects if the device provides an electronic, optical or RF connection between the two other objects.

DETAILED DESCRIPTION OF THE EMBODIMENTS

Some embodiments are directed to the simplification of signal processing in wavelength-division multiplexing (WDM) systems (e.g., coherent optical transmission systems) by using correlated carrier signals at transmitters and correlated oscillating signals at receivers. Given the correlations between these signals, some of the processing information generated in one receiver can be shared with another receiver, so that the second receiver is relieved of the processing burden of having to independently generate the same processing information. Since some of the processing information is thus shared, it is possible to reduce the complexity and redundancy in the circuitry of one or both receivers. Additionally, since there is no need to duplicate the generation of the shared processing information, the overall power consumption of the receivers is also reduced. In some embodiments, the receivers, and or the associated digital signal processing cores are integrated on a single die, which facilitates the sharing of information between the receivers. In some example systems with correlated carrier signals and oscillating signals, the correlated carrier signals are modulated to encode information, and each modulated carrier signal experiences distortions similar to those experienced by the other modulated carrier signals during transmission through a transmission link.

In accordance with some embodiments, the correlation is based on the phase of each carrier signal. In accordance with some embodiments, the correlation is based on the frequency of each carrier signal. In accordance with some embodiments, the correlation is based on both the phase and the frequency of each carrier signal. In accordance with some embodiments, the correlation is based on the phase of each oscillating signal. In accordance with some embodiments, the correlation is based on the frequency of each oscillating signal. In accordance with some embodiments, the correlation is based on both the phase and the frequency of each oscillating signal. In some embodiments, the correlation is based on the phase and/or frequency of each carrier signal, and the phase and/or frequency of each oscillating signal.

An example embodiment of a WDM system, as described, includes modules (e.g., modems, transceivers, receivers) that operate (e.g., demodulate) simultaneously on two or more carrier wavelengths, thus possessing either physically distinct processing cores, shared cores, or shared parts of processing cores. In some embodiments, the WDM system is a coherent optical system and uses a quadrature amplitude modulation (QAM) modulation scheme. In other embodiments, the WDM system is a non-coherent optical system and uses pulse-amplitude modulation (PAM), orthogonal frequency-division multiplexing (OFDM), or an intensity-modulated direct detection (IMDD) modulation scheme. In some embodiments, the system is an RF system containing phased arrays with correlated carriers. The RF system can use digital signal processing (DSP) cores in the receiver that can share information according to the embodiments described herein. In some cases, the RF system can incorporate multiple carrier channels, use a multicarrier system, or an OFDM, or amplitude and phase shift keying (APSK) modulation schemes. In some cases, the RF system uses frequency-division multiplexing (FDM) and contains correlated carrier signals at different frequencies. In some cases, the modulated carrier signals (i.e., the signals that are encoded with information) in the RF system can experience distortions during transmission, where the distortions are the same or similar between different channels (e.g., having different carrier frequencies). One example of distortions that can affect signals in RF system using FDM are multipath interference distortions, which arise due to a signal following multiple paths between one or more transmit antennas and one or more receive antennas. In some cases, the multipath interference distortions in RF systems cause distortions that are similar, or the same, between the different channels in an RF system that uses FDM.

In accordance with some embodiments, portions of the processing cores share (send or receive) information that includes demodulation and/or equalization process information regarding specific information channel values obtained during information demodulation and equalization. In accordance with some embodiments, process information includes one (or more; or all) of: 1) an estimated carrier signal phase offset, 2) an estimated carrier signal frequency offset, 3) an estimated accumulated chromatic dispersion (or a coarse estimate thereof), and 4) demodulated symbol information.

Other than physical channel characteristics and optical carrier signal characteristics, the process information regarding received symbols can be exchanged by the processing cores or units, either as hard information (e.g., exact estimated symbols, or bits after completing the full demodulation process), or as soft information (e.g., respective probabilities of bits being one, or zero in terms of so called likelihood values, ratios, or the estimates thereof in a linear, or logarithmic representation). In some embodiments, soft information that is shared can include likelihood values, ratios, linear estimates of likelihood values, linear estimates of ratios, logarithmic representations of likelihood values, and logarithmic representations of ratios.

Redundant signal processing in WDM information channel receivers is avoided or reduced by using correlated carrier signals at a transmitting portion of a transmission link and correlated local oscillating signals at a receiving portion of the transmission link. The correlated carrier signals and the correlated oscillating signals originate from respective emitters with mutually correlated phases and/or frequencies.

The use of correlated signals enables two or more signal processing blocks of distinct information channel receivers to share relevant process information between processing blocks, since the correlation of the signals leads to the generated process information being the same or sufficiently similar in both receivers. This sharing of process information results in reduced complexity, redundancy and power consumption of the WDM system when compared to a WDM system that relies on independent WDM information channel receivers that track independently varying information channels.

In accordance with some embodiments, two or more information channels in the system are processed by a single transceiver module (e.g., of a modem). In accordance with some embodiments, the single transceiver module includes a single digital signal processing unit with multiple processing cores (e.g., the cores are on the same die), where each processing core processes a different information channel wavelength and each of the processing cores has appropriate connections to the other processing cores of the digital processing unit to permit the exchange of process information between the processing cores.

In accordance with some embodiments, a single transceiver module includes physically separate processing units, where each of the processing units has appropriate connections to other processing units of the transceiver module to permit the exchange of process information between the processing units.

This approach enables a modular modem and processing core realization, whereby multiple processing cores (or modems) corresponding to different information channels are incorporated in a single module to facilitate cooperative processing.

Figure 1:
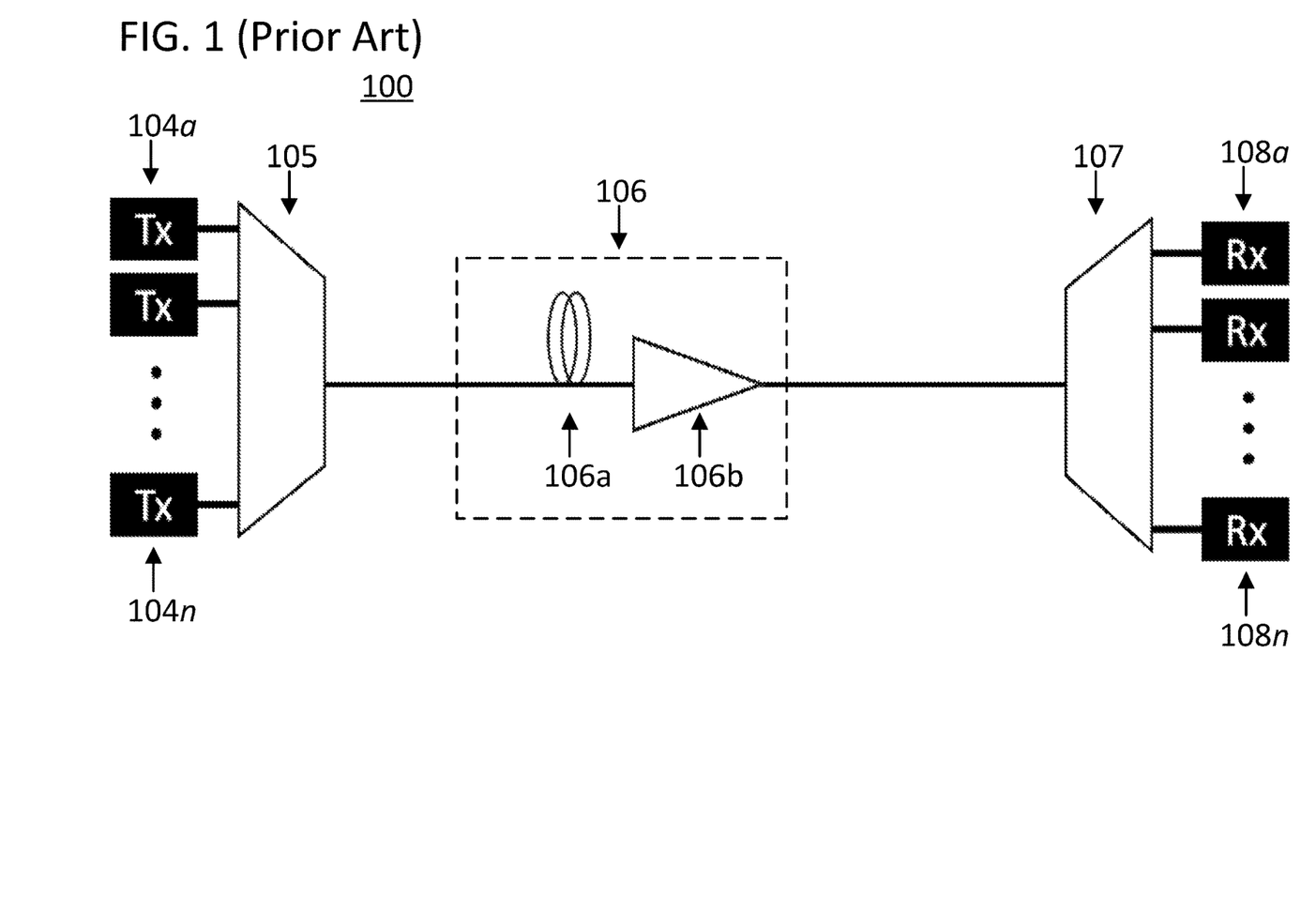
FIG. 1 is a simplified schematic diagram of a prior art wavelength-division multiplexing (WDM) system.

FIG. 1 provides a simplified schematic diagram of a prior art wavelength-division multiplexing (WDM) system 100. As shown, the system 100 includes independent transmitters 104a-n connected to a wavelength-division multiplexer 105, which is connected to a first portion of a transmission link 106. Each of the independent transmitters 104a-n uses a respective independent carrier signal emitter (e.g., a laser; not shown). The transmission link 106 includes a span of optical fiber 106a and optical amplifiers 106b. The optical amplifiers 106b are repeated periodically or as needed throughout the transmission link 106. A second portion of the transmission link 106 is connected to an input of a wavelength-division de-multiplexer 107, which is connected to independent receivers 108a-n. Each of the independent receivers 108a-n uses a respective independent local oscillating signal emitter (e.g., a laser; not shown).

Each of the independent transmitters 104a-n receives an independent carrier signal and modulates the received carrier signal with transmission data to form a modulated carrier signal corresponding to an information channel. The wavelength-division multiplexer 105 receives the modulated carrier signals and combines them for transmission through the transmission link 106. The transmitted modulated carrier signals may be additionally encoded for error correction processes (e.g., ECC, encryption processes, or other additional encodings known in the art).

The wavelength-division de-multiplexer 107 receives the modulated carrier signals from the transmission link 106 and separates them into individual modulated carrier signals. The independent local oscillating signal emitters (not shown) produce oscillating signals at different wavelengths, where each oscillating signal has a wavelength that matches a wavelength of a corresponding one of the carrier signals. The independent receivers 108a-n each receives one of the modulated carrier signals, and receives an oscillating signal from a corresponding independent local oscillating signal emitter.

Each of the independent receivers 108a-n corrects impairments accumulated in transmission of the respective information channel's modulated carrier signal, and uses, during demodulating and equalizing, the received modulated carrier signal and the received oscillating signal to retrieve at least a portion of the transmission data.

Figure 2:
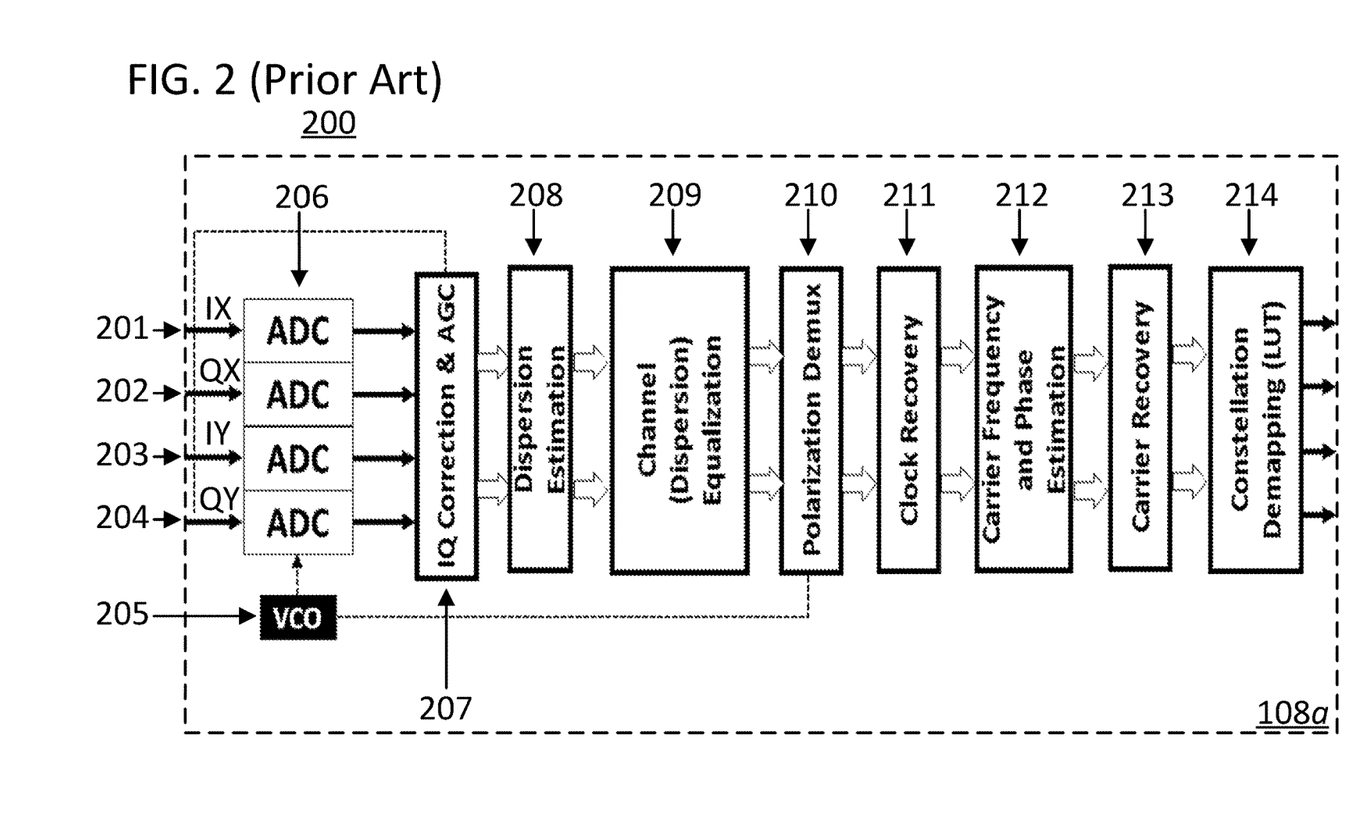
FIG. 2 is a simplified schematic diagram of a portion of an example prior art WDM receiver.

FIG. 2 provides a simplified schematic diagram of a portion of an example prior art WDM receiver ("receiver") 108a. Some elements are omitted for ease of illustration and explanation.

As shown, the receiver 108a includes all or a portion of a processing chain (e.g., a portion of a receiver's processing core) for the demodulation and equalization process of a single WDM information channel corresponding to one carrier signal. The processing chain includes, but is not limited to, multiple processing blocks. Processing includes equalization of impairments accumulated in transmission of a combined modulated carrier signal (as described with respect to FIG. 1), followed by demodulation and information retrieval.

Signal 201 through signal 204 are in-phase and quadrature components (IX, QX, IY and QY) of the X and Y polarizations of the electric field for a single WDM information channel (e.g., after photo-detection). A voltage-controlled-oscillator (VCO) 205 provides an oscillating signal to an analog-to-digital converter (ADC) conversion block 206 and provides an oscillating signal to a polarization de-mux block 210. Respective digital representations of the signals 201 through 204 are transmitted from the ADC conversion block 206 to an in-phase and quadrature component (IQ) correction and auto-gain-control (AGC) block 207, which performs in-phase and quadrature imbalance correction and scaling. At dispersion estimation block 208, accumulated chromatic dispersion is estimated. Then, at channel equalization block 209, either or both of chromatic dispersion equalization and compensation is performed, followed by the polarization de-multiplexing block 210 which performs polarization decoupling and equalization. Next, clock estimation block 211 performs clock recovery. Carrier frequency and phase estimation block 212 estimates the frequency and phase of the carrier signal. At carrier recovery block 213, carrier signal phase and frequency compensation is performed, and at constellation de-mapping block 214, constellation de-mapping is performed.

Processing blocks similar to processing block 206 through processing block 214 are repeated for each of the receivers 108a-n.

Example embodiments directed to the simplification of signal processing in WDM systems are discussed next.

Figure 3:
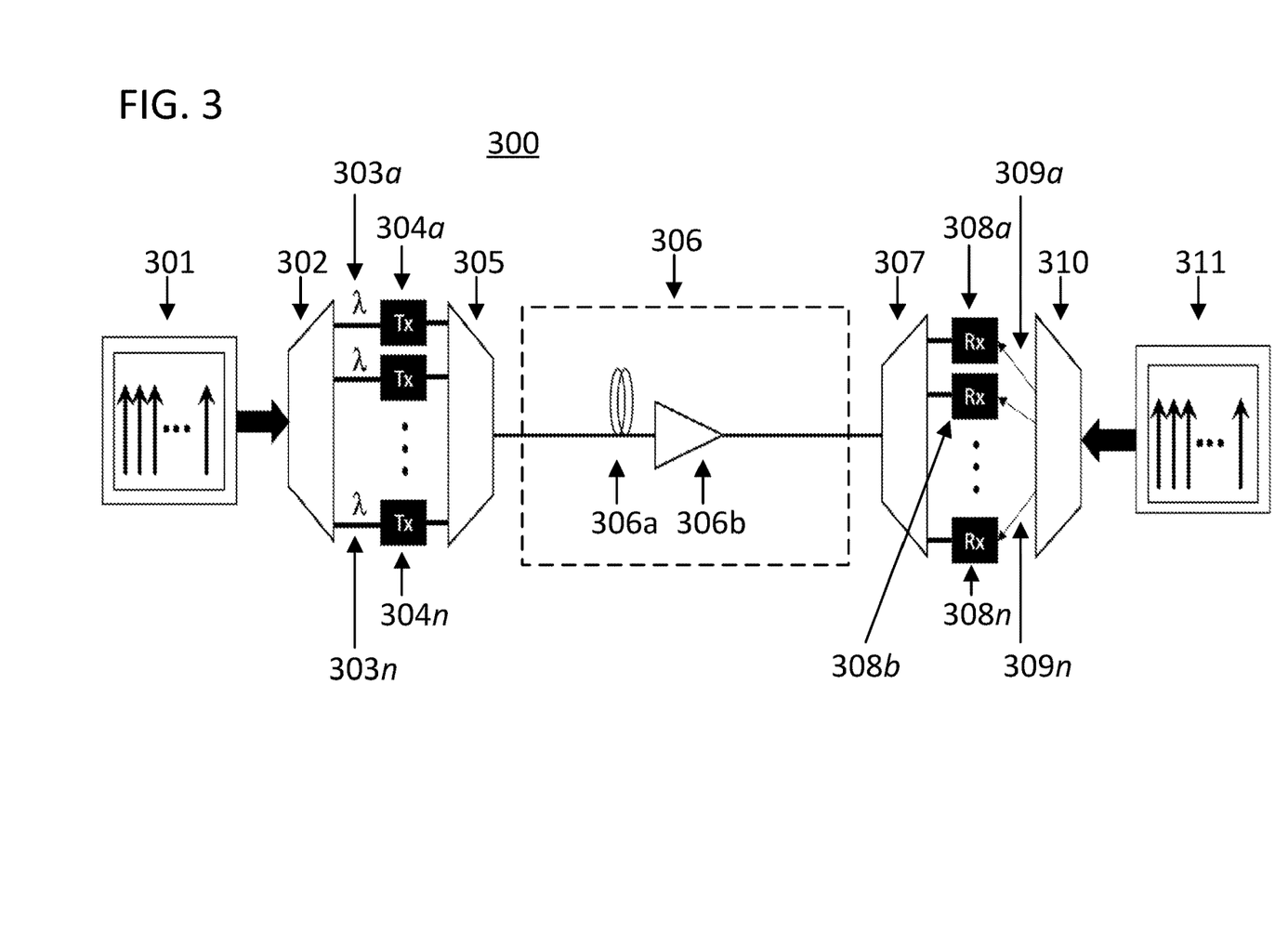
FIG. 3 is a simplified schematic diagram of a WDM transmission system, in accordance with one or more example embodiments.

FIG. 3 provides a simplified schematic diagram of a WDM transmission system 300 that includes the sharing of process information, in accordance with one or more example embodiments. As shown, the system 300 includes a multiwavelength signal emitter 301 of correlated carrier signals which is connected to a wavelength-division de-multiplexer 302. Correlated carrier signals 303a-n output from the wavelength-division de-multiplexer 302 are shown. The wavelength-division de-multiplexer 302 is connected to transmitters 304a-n, which are similar to the independent transmitters 104a-n previously described with respect to FIG. 1. The transmitters 304a-n are connected to a wavelength-division multiplexer 305, which is connected to a first portion of a transmission link 306.

In some embodiments, the a multiwavelength signal emitter generates one or more wideband, highly coherent frequency combs having one or more respective optical frequency tones ("tones") that are mutually locked, or aligned, in frequency relative to each other. Optical frequency combs ("combs") represent multi-line emitters characterized by equally-spaced emission lines in the frequency domain. Two or more combs, of the same, or similar pitch can be mutually frequency locked, or referenced, by using an emission line from the output spectrum of the first comb as a reference for frequency and/or phase alignment of one or more other combs. The (at least) two combs can be at physically different locations.

In some embodiments, the correlated carrier signals (e.g., generated by the multiwavelength signal emitter 301) are high quality. In some cases, high quality correlated carrier signals have a high degree of phase stability and/or a low amount of phase noise. For example, the correlated carrier signals can have line widths less than 100 kHz, or less than 10 kHz, or less than 3 kHz. The term "line width" in this case refers to the spread in frequency, or wavelength, of each correlated carrier signal. For example, the line width can refer to the full width at half maximum of the frequency or wavelength distribution of each carrier signal, where the distribution of each carrier is approximately Lorentzian, Gaussian, or other appropriate line shaped distribution.

The transmission link 306 includes a span of optical fiber 306a and optical amplifiers 306b. The optical amplifiers 306b are repeated periodically as needed throughout the transmission link 306. A second portion of the transmission link 306 is connected to an input of a wavelength-division de-multiplexer 307, which is connected to receivers 308a-n. The receivers 308a-n are connected to a wavelength-division de-multiplexer 310. Correlated oscillating signals 309a-n are output from the wavelength-division de-multiplexer 310 as shown. A multiwavelength signal emitter 311 of correlated signals is connected to the wavelength-division de-multiplexer 310, which is connected to the receivers 308a-n.

In accordance with some embodiments, some (or all) of the receivers 308a-n are included in a modem. In accordance with some embodiments, some (or all) of the receivers 308a-n are included in a transceiver. In accordance with some embodiments, some (or all) of the receivers 308a-n are implemented as distinct processing units. In accordance with some embodiments, some (or all) of the receivers 308a-n are implemented as processing cores within a processing unit.

The multiwavelength signal emitter 301 and the wavelength-division de-multiplexer 302 produce the correlated carrier signals 303a-n at different wavelengths. Each of the correlated carrier signals 303a-n output from the wavelength-division de-multiplexer 302 is received by a portion of a respective transmitter of the transmitters 304a-n. Each of the transmitters 304a-n modulates its respective received carrier signal with respective transmission data to form a modulated carrier signal corresponding to an information channel. The wavelength-division multiplexer 305 receives the modulated carrier signals and combines them for transmission through the transmission link 306. In some cases, each modulated carrier signal experiences distortions similar to those experienced by the other modulated carrier signals during transmission through the transmission link 306. The transmitted modulated carrier signals may be additionally encoded for error correction processes (e.g., ECC), encryption processes, or other additional encodings known in the art).

The wavelength-division de-multiplexer 307 receives the modulated carrier signals from the transmission link 306 and separates them into individual modulated carrier signals. The multiwavelength signal emitter 311 produces correlated oscillating signals of different wavelengths. The correlated oscillating signals produced by the multiwavelength signal emitter 311 are separated into individual oscillating signals 309a-n by the wavelength-division de-multiplexer 310. Each of the correlated oscillating signals 309a-n has a wavelength that matches a wavelength of a corresponding one of the correlated carrier signals 303a-n.

A portion of each of the receivers 308a-n receives a modulated carrier signal and a corresponding oscillating signal. As will be discussed in detail with respect to FIG. 4 and FIG. 5, one or more portions of each of the receivers 308a-n is connected to at least one or more portions of another receiver of the receivers 308a-n and is operable to share (e.g., send or receive) process information.

In accordance with some embodiments, a portion of each receiver of the receivers 308a-n receives the process information. Each of the receivers that receives the process information uses, during the demodulating and equalizing, the received modulated carrier signal, the received oscillating signal, and the received process information to retrieve at least a portion of the transmission data.

Figure 4:
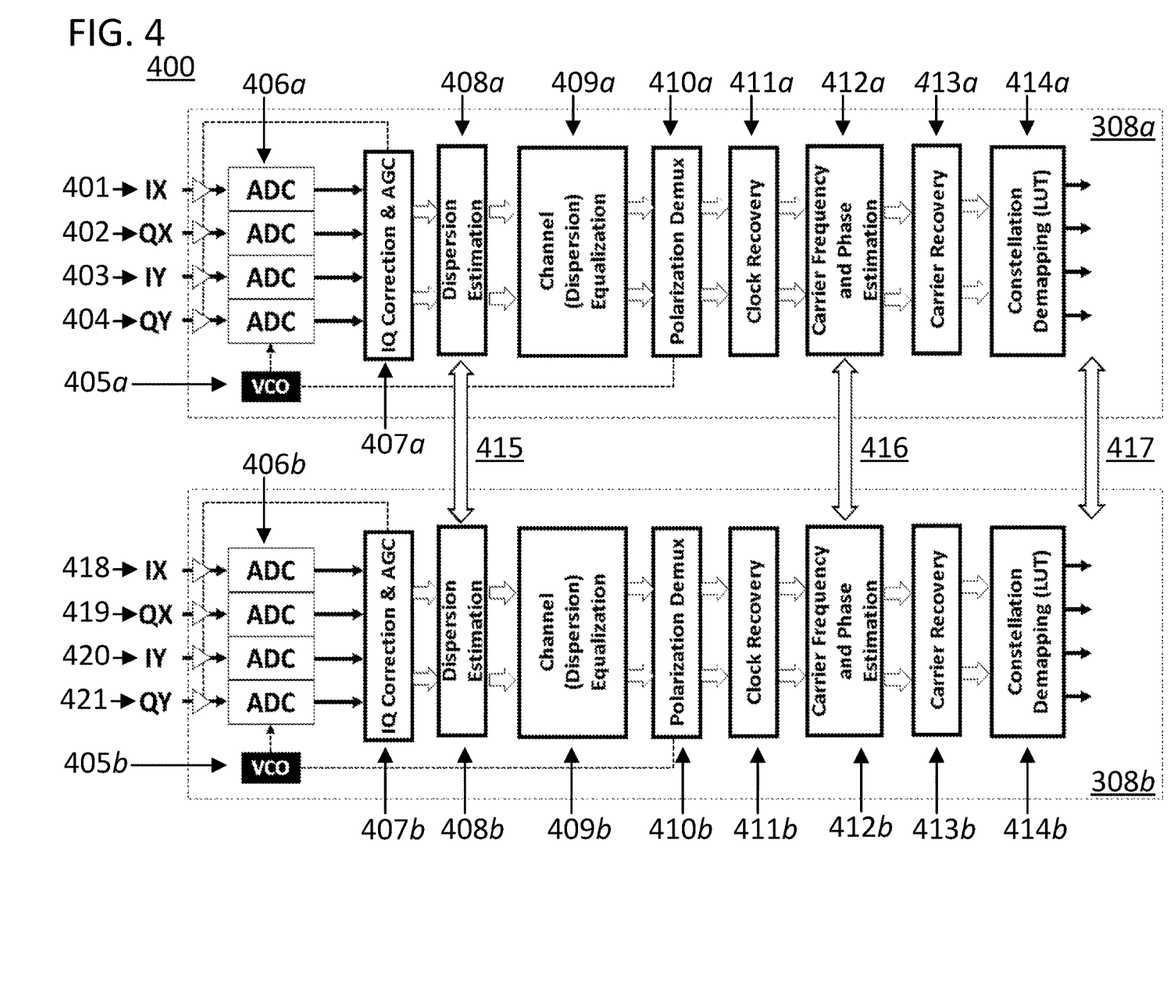
FIG. 4 is a simplified schematic diagram of portions of two WDM receivers for use in the WDM system shown in FIG. 3, in accordance with one or more example embodiments.

FIG. 4 provides a simplified schematic diagram of portions of two WDM receivers 308a-b (e.g., a processing chains), for use in the WDM system 300 shown in FIG. 3, that share process information in accordance with one or more example embodiments. In the example embodiment shown, processing cores of two (or more) receivers exchange process information as units with equal decision power. The exchange of process information occurs in the digital space in this example, i.e., after the received analog signals have been converted to digital signals. Though an example embodiment of cooperative sharing of process information between two receivers is shown, other topologies (e.g., a master-slave configuration) are used in other embodiments.

Processing by blocks 406a through 414a, and processing by blocks 406b through 414b, includes equalization of impairments accumulated in transmission of combined modulated carrier signals (as was described with respect to FIG. 2), followed by demodulation and information retrieval. The WDM receivers 308a-b shown in FIG. 4 are examples provided for illustrative and descriptive purposes only, so one or more of the processing blocks 407a-414a and 407b-414b can be removed or modified, and/or one or more additional processing blocks (not shown) can be added, in practicing different embodiments of the concepts disclosed herein.

The receivers 308a-b each includes a portion of a processing chain for the demodulation and equalization process of two respective WDM information channels. Signal 401 through signal 404, and signal 418 through 421, are similar to signals 201 through 204 as were discussed with respect to FIG. 2. Except where otherwise specified, processing blocks of FIG. 4 are similar to like-numbered processing blocks of FIG. 2. For example, ADC blocks 406a-b are similar to the ADC block 206; VCO blocks 405a-b are similar to the VCO block 205, and so on.

In the example embodiment shown, the portions of the receiver 308a and the receiver 308b cooperatively share process information. For example, dispersion estimation block 408a of the receiver 308a is connected to dispersion estimation block 408b of the receiver 308b. Process information 415 is thus shared between the dispersion estimation blocks 408a-b. For example, the accumulated chromatic dispersion process information 415 that is shared between the dispersion estimation blocks 408a-b can be from 1000 ps/nm to 100,000 ps/nm, or from 10,000 ps/nm to 50,000 ps/nm.

In some embodiments, an additional block for correcting phase nonlinearity can be included in the receivers 308a and 308b in between block 407a and 408a, and also between block 407b and 408b. In some cases, the phase nonlinearity correction can be dependent on the power of the received modulated carrier signal. In some embodiments, the nonlinearity correction may be based on multiple, or all, channels involved in the shared information process, or the multiple input, multiple output (MIMO) principles. For example, in RF systems, MIMO is a method for multiplying the capacity of a radio link using multiple transmit and receive antennas to reduce noise (e.g., by exploiting multipath propagation).

Additionally, carrier frequency and phase estimation block 412a of the receiver 308a is connected to carrier frequency and phase estimation block 412b of the receiver 308b. Process information 416 is thus shared between the carrier frequency and phase estimation blocks 412a-b. For example, the estimated frequency offset of the carrier signal process information 416 that is shared between the carrier frequency and phase estimation blocks 412a-b can be less than 5 GHz, or less than 2 GHz, or from 1 kHz to 10 GHz, or from 1 kHz to 5 GHz, in different embodiments. For example, the estimated phase offset of the carrier signal process information 416 that is shared between the carrier frequency and phase estimation blocks 412a-b can be from 0 to $2\pi$ radians, in different embodiments.

As shown, process information 417 (e.g., demodulated symbol information) is also shared between the receivers 308a-b.

In accordance with some embodiments, processing blocks of the receiver 308a are used to generate one (or all) of: all or a portion of the process information 415, all or a portion of the process information 416, and all or a portion of the process information 417. The process information 415, the process information 416 and the process information 417 is provided to corresponding processing blocks of the receiver 308b.

In accordance with some embodiments, processing blocks of the receiver 308b are used to generate one (or all) of: all or a portion of the process information 415, all or a portion of the process information 416, and all or a portion of the process information 417. The process information 415, the process information 416 and the process information 417 is provided to processing blocks of the receiver 308a.

In accordance with some embodiments, each of the receivers 308a-b generate and share all or a portion of the process information 415, the process information 416, and the process information 417.

Signal processing cooperation through process information sharing can be taken advantage at multiple points within the processing chain. The process information can include one or more (or all) of: 1) an estimated carrier signal phase offset, 2) an estimated carrier signal frequency offset, 3) an estimated accumulated chromatic dispersion, and 4) demodulated symbol information. The latter can be passed in as "hard" process information (e.g., firmly decided upon symbols), or "soft" process information (e.g., in terms of the likelihood values, or ratios). In some cases, a second receiver, which receives shared information from a first receiver, can use the shared information as the sole input for a process in the second receiver, or the second receiver can use the shared information to modify information that the second receiver determines itself.

Though cooperative process information sharing is shown between the two receivers 308a-b, cooperative process information sharing can occur between more than two receivers.

In some embodiments, there can also be crosstalk between the WDM information channels. For example, the difference in carrier wavelength between the information channels can be similar to, or smaller than, the wavelength shifts that occur within a channel due to the modulation information encoding. In other words, crosstalk can occur when the wavelengths of some of the symbols transmitted within a given WDM information channel overlap with the wavelengths of some of the symbols transmitted within an adjacent WDM information channel. In some embodiments, the crosstalk can occur between channels due to crosstalk in various system components, such as the imperfect selection of polarizing beam splitters, optical multiplexers (and/or demultiplexers), or crosstalk in multichannel DACs and ADCs. In some embodiments, the crosstalk between the channels in a WDM system can be linear or nonlinear, and can be instantaneous, or include memory effects. Memory effects in this context means that the response of a given system component (e.g., one that induces crosstalk) at a time instant of interest depends on, and is influenced by, signal values in surrounding time instants. In some embodiments, the receivers in a communication system (e.g., 308a-b in FIG. 4) can contain an additional processing block to mitigate the crosstalk effects between receivers. The processing blocks to mitigate the crosstalk between the receivers can also share information with one another, using processes similar to those described above with respect to some of the processing blocks in FIG. 4 (e.g., 415, 416 and 417).

Figure 5:
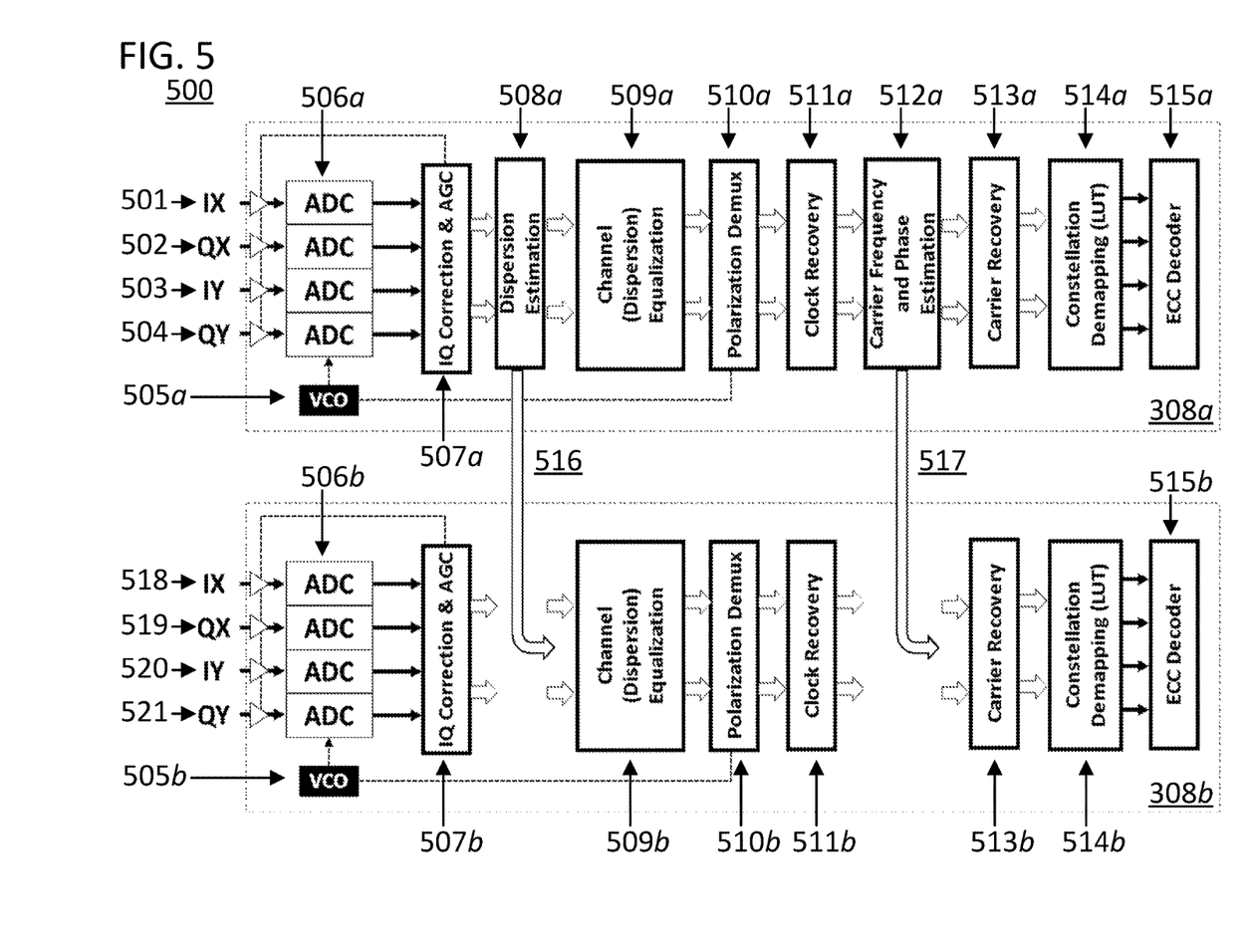
FIG. 5 is a simplified schematic diagram of portions of two WDM receivers for use in the WDM system shown in FIG. 3, in accordance with one or more example embodiments.

FIG. 5 provides a simplified schematic diagram of portions of two WDM receivers 308a-b (e.g., processing chains), for use in the WDM system 300 shown in FIG. 3, that share process information in a master-slave configuration in accordance with one or more example embodiments. The system shown in FIG. 5 is similar to the system shown in FIG. 4, and much of the above description and quantitative ranges described regarding FIG. 4 also apply to different embodiments of the system shown in FIG. 5. Furthermore, the WDM receivers 308a-b shown in FIG. 5 are examples provided for illustrative and descriptive purposes only, so one or more processing blocks 507a-515a and 507b-515b can be removed or modified, and/or one or more additional processing blocks can be added, in practicing different embodiments of the concepts disclosed herein.

In the example embodiment shown, processing cores of two (or more) receivers exchange process information in a master-slave arrangement. In the master-slave arrangement, a master receiver core (e.g., 308a) provides process information to one or more other slave receiver cores (e.g., 308b). In some embodiments of such an arrangement, the master receiver core has the "deciding power" for generating the process information, and the slave receiver core cannot generate that process information. In other embodiments, the master receiver core generates the process information and provides it to the slave receiver, and the slave receiver core generates process information and does not share that process information with any other receiver. For example, the slave receiver can generate process information, and use the information from the master receiver to modify the process information that the salve receiver has generated.

Processing by blocks 506a through 515a, and processing by blocks 506b through 515b, includes equalization of impairments accumulated in transmission of combined modulated carrier signals (as was described with respect to FIG. 2), followed by demodulation and information retrieval.

In the example embodiment shown, the receivers 308a-b each includes a portion of a processing chain for the demodulation and equalization process of two respective WDM information channels. Signal 501 through signal 504, and signal 518 through 521, are similar to signals 201 through 204 as discussed with respect to FIG. 2. Except where otherwise specified, processing blocks of FIG. 5 are similar to like-numbered processing blocks of FIG. 2. For example, ADC blocks 506a-b are similar to the ADC block 206; VCO blocks 505a-b are similar to the VCO block 205; and so on.

In the embodiment of the receiver 308a shown, a constellation de-mapping block 514a is connected to an ECC decoder block 515a. Likewise, in the embodiment of the receiver 308b shown, a constellation de-mapping block 514b is connected an ECC decoder block 515b. The ECC decoder blocks 515a-b perform error code correction within their respective signal processing chains.

In the example embodiment shown, a dispersion estimation block 508a of the receiver 308a is connected to a channel equalization block 509b of the receiver 308b. Thus, the channel equalization block 509b receives process information 516 that is generated by the dispersion estimation block 508a. In the example embodiment shown, a channel equalization block is fully or partially absent from the receiver 308b.

Additionally, a carrier frequency and phase estimation block 512a of the receiver 308a is connected to a carrier recovery block 513b of the receiver 308b. Thus, the carrier recovery block 513b receives process information 517 that is generated by the carrier frequency and phase estimation block 512a. In the example embodiment shown, a carrier frequency and phase estimation block is fully or partially absent from the receiver 308b.

Figure 6A:
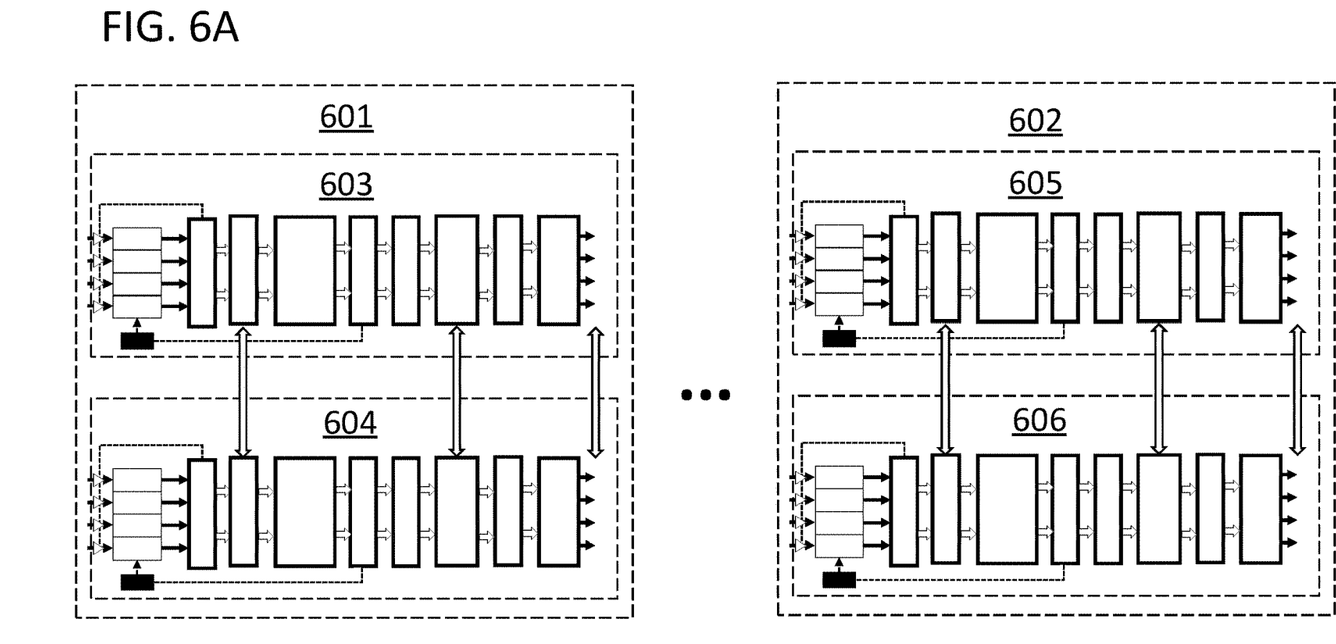
FIGS. 6A and 6B are simplified schematic diagrams of groups of WDM receivers for use in the WDM system shown in FIG. 3, in accordance with one or more example embodiments.
Figure 6B:
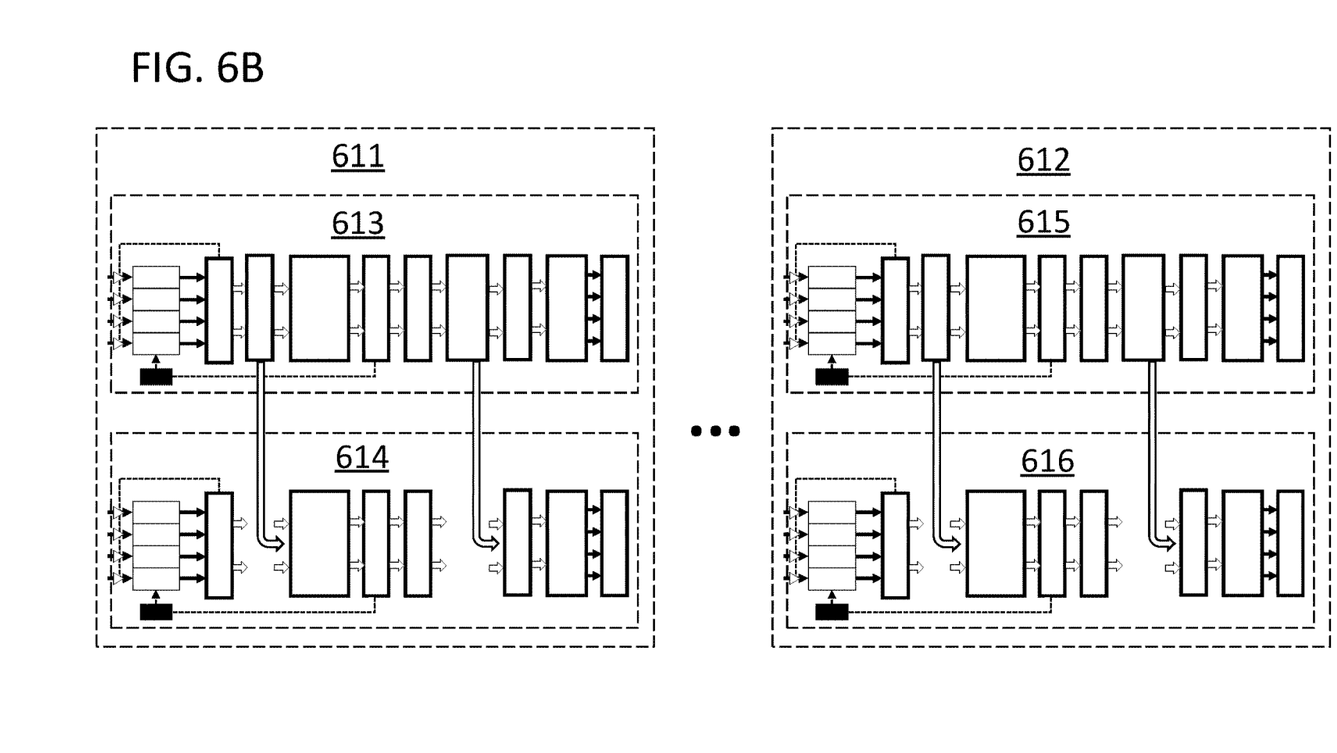

The examples depicted in FIGS. 4 and 5 show two receivers sharing process information, however, in other embodiments there may be more than two receivers sharing process information. In some embodiments, there are from 2 to 1000, or from 10 to 1000, or from 100 to 1000 receivers sharing process information. In some embodiments, as shown in FIGS. 6A and 6B, there are groups (e.g., 601-602 and 611-612) of receivers (e.g., 603-606 and 613-616) sharing process information, and there are from 2 to 8 receivers in each group. In some embodiments, there are from 2 to 500, or from 2 to 100, or from 2 to 10 groups of receivers sharing process information. FIGS. 6A and 6B show non-limiting examples of groups of receivers with 2 receivers in each group sharing process information. The receivers in the groups and the sharing of processing information in FIGS. 6A and 6B are similar to those shown in FIGS. 4 and 5, respectively. FIG. 6A shows a first group 601 of receivers 603/604 where receiver 603 in the group 601 is connected to at least one other receiver 604 in the group 601 to share process information, and a second group 602 of receivers 605/606 where receiver 605 in the group 602 is connected to at least one other receiver 606 in the group 602 to share process information. In some embodiments, the groups of receivers sharing process information each contain at least one master receiver and the at least one other receivers in the group are slave receivers. FIG. 6B shows a first group 611 of receivers 613/614, where receiver 613 in the group 611 is a master receiver that generates and sends the process information, and receiver 614 is a slave receiver that receives the process information and is not capable of generating the process information to share process information. FIG. 6B also shows a second group 612 of receivers 615/616, where receiver 615 in the group 612 is a master receiver that generates and sends the process information, and receiver 616 is a slave receiver that receives the process information and is not capable of generating the process information to share process information.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A wavelength-division multiplexed system comprising:
a transmission portion comprising:
carrier signal emitters that produce carrier signals at different wavelengths and that are phase or frequency correlated with each other;
transmitters, each transmitter being connected to a corresponding one of the carrier emitters to receive a corresponding carrier signal therefrom, and each transmitter modulating the received carrier signal with transmission data to form a modulated carrier signal; and
a wavelength-division multiplexer connected to the transmitters to receive the modulated carrier signals and that combines the modulated carrier signals for transmission through a transmission link; and
a reception portion comprising:
a wavelength-division de-multiplexer that receives the modulated carrier signals from the transmission link and separates them into individual modulated carrier signals;
oscillators that produce oscillating signals at different wavelengths and that are phase or frequency correlated with each other, each oscillating signal having a wavelength that matches a wavelength of a corresponding one of the carrier signals; and
a plurality of receivers, each receiver being connected to the wavelength-division de-multiplexer to receive one of the modulated carrier signals and being connected to a corresponding one of the oscillators to receive a corresponding oscillating signal therefrom, each receiver being connected to at least one other receiver in the plurality of receivers to share process information, and each receiver that receives the process information using the received modulated carrier signal, the received oscillating signal, and the received process information to retrieve at least a portion of the transmission data;
wherein the plurality of receivers further comprise:
at least one master receiver that generates and sends the process information; and
at least one slave receiver that receives the process information and is not capable of generating the process information.

2. The wavelength-division multiplexed system of claim 1, wherein:
the process information comprises an estimated carrier signal phase offset; and
the estimated carrier signal phase offset is from 0 to $2\pi$ radians.

3. The wavelength-division multiplexed system of claim 1, wherein:
the process information comprises an estimated carrier signal frequency offset; and
the estimated carrier signal frequency offset is less than 2 GHz.

4. The wavelength-division multiplexed system of claim 1 wherein the process information comprises an estimated accumulated chromatic dispersion.

5. The wavelength-division multiplexed system of claim 1 wherein the process information comprises demodulated symbol information.

6. The wavelength-division multiplexed system of claim 1 wherein the process information comprises firmly decided upon information.

7. The wavelength-division multiplexed system of claim 1, wherein:
the process information comprises soft information; and
the soft information is selected from the group consisting of: likelihood values, ratios, linear estimates of likelihood values, linear estimates of ratios, logarithmic representations of likelihood values, and logarithmic representations of ratios.

8. A wavelength-division multiplexed system comprising:
a transmission portion comprising:
carrier signal emitters that produce carrier signals at different wavelengths and that are phase or frequency correlated with each other;
transmitters, each transmitter being connected to a corresponding one of the carrier emitters to receive a corresponding carrier signal therefrom, and each transmitter modulating the received carrier signal with transmission data to form a modulated carrier signal; and
a wavelength-division multiplexer connected to the transmitters to receive the modulated carrier signals and that combines the modulated carrier signals for transmission through a transmission link; and
a reception portion comprising:
a wavelength-division de-multiplexer that receives the modulated carrier signals from the transmission link and separates them into individual modulated carrier signals;
oscillators that produce oscillating signals at different wavelengths and that are phase or frequency correlated with each other, each oscillating signal having a wavelength that matches a wavelength of a corresponding one of the carrier signals; and a plurality of receivers, each receiver being connected to the wavelength-division de-multiplexer to receive one of the modulated carrier signals and being connected to a corresponding one of the oscillators to receive a corresponding oscillating signal therefrom, each receiver being connected to at least one other receiver in the plurality of receivers to share process information, and each receiver that receives the process information using the received modulated carrier signal, the received oscillating signal, and the received process information to retrieve at least a portion of the transmission data;

wherein the plurality of receivers further comprise:
  a plurality of groups of receivers;
  wherein:
    each group of receivers comprises a plurality of receivers; and
    each receiver in a group is connected to at least one other receiver in the group to share process information.

9. The wavelength-division multiplexed system of claim 8 wherein each group of receivers comprises:
  at least one master receiver that generates and sends the process information; and
  at least one slave receiver that receives the process information and is not capable of generating the process information.

10. A frequency-division multiplexed system comprising:
  a transmission portion comprising:
    carrier signal emitters that produce carrier signals at different frequencies and that are phase or frequency correlated with each other;
    transmitters, each transmitter being connected to a corresponding one of the carrier emitters to receive a corresponding carrier signal therefrom, and each transmitter modulating the received carrier signal with transmission data to form a modulated carrier signal; and
    a frequency-division multiplexer connected to the transmitters to receive the modulated carrier signals and that combines the modulated carrier signals for transmission through a transmission link; and
  a reception portion comprising:
    a frequency-division de-multiplexer that receives the modulated carrier signals from the transmission link and separates them into individual modulated carrier signals;
    oscillators that produce oscillating signals at different frequencies and that are phase or frequency correlated with each other, each oscillating signal having a frequency that matches a frequency of a corresponding one of the carrier signals;
    a plurality of receivers, each receiver being connected to the frequency-division de-multiplexer to receive one of the modulated carrier signals and being connected to a corresponding one of the oscillators to receive a corresponding oscillating signal therefrom, each receiver being connected to at least one other receiver in the plurality of receivers to share process information, and each receiver that receives the process information using the received modulated carrier signal, the received oscillating signal, and the received process information to retrieve at least a portion of the transmission data;

wherein the receivers further comprise:
    at least one master receiver that generates and sends the process information; and
    at least one slave receiver that receives the process information and is not capable of generating the process information.

11. The frequency-division multiplexed system of claim 10 wherein the process information comprises an estimated carrier signal phase offset, and wherein
  the estimated carrier signal phase offset is from 0 to $2\pi$ radians.

12. The frequency-division multiplexed system of claim 10 wherein the process information comprises an estimated carrier signal frequency offset, and wherein
  the estimated carrier signal frequency offset is less than 2 GHz.

13. The frequency-division multiplexed system of claim 10 wherein the process information comprises demodulated symbol information.

14. The frequency-division multiplexed system of claim 10 wherein the process information comprises firmly decided upon information.

15. The frequency-division multiplexed system of claim 10 wherein the process information comprises soft information, and wherein the soft information is selected from the group consisting of: likelihood values, ratios, linear estimates of likelihood values, linear estimates of ratios, logarithmic representations of likelihood values, and logarithmic representations of ratios.

16. A frequency-division multiplexed system comprising:
  a transmission portion comprising:
    carrier signal emitters that produce carrier signals at different frequencies and that are phase or frequency correlated with each other;
    transmitters, each transmitter being connected to a corresponding one of the carrier emitters to receive a corresponding carrier signal therefrom, and each transmitter modulating the received carrier signal with transmission data to form a modulated carrier signal; and
    a frequency-division multiplexer connected to the transmitters to receive the modulated carrier signals and that combines the modulated carrier signals for transmission through a transmission link; and
  a reception portion comprising:
    a frequency-division de-multiplexer that receives the modulated carrier signals from the transmission link and separates them into individual modulated carrier signals;
    oscillators that produce oscillating signals at different frequencies and that are phase or frequency correlated with each other, each oscillating signal having a frequency that matches a frequency of a corresponding one of the carrier signals;
    a plurality of receivers, each receiver being connected to the frequency-division de-multiplexer to receive one of the modulated carrier signals and being connected to a corresponding one of the oscillators to receive a corresponding oscillating signal therefrom, each receiver being connected to at least one other receiver in the plurality of receivers to share process information, and each receiver that receives the process information using the received modulated carrier signal, the received oscillating signal, and the received process information to retrieve at least a portion of the transmission data;

wherein the plurality of receivers further comprise:

a plurality of groups of receivers;
wherein:
 each group of receivers comprises a plurality of receivers; and
 each receiver in a group is connected to at least one other receiver in the group to share process information.

17. The frequency-division multiplexed system of claim 16 wherein each group of receivers comprises:
 at least one master receiver that generates and sends the process information; and
 at least one slave receiver that receives the process information and is not capable of generating the process information.

18. The wavelength-division multiplexed system of claim 8, wherein:
 the process information comprises an estimated carrier signal phase offset; and
 the estimated carrier signal phase offset is from 0 to $2\pi$ radians.

19. The wavelength-division multiplexed system of claim 8, wherein:
 the process information comprises an estimated carrier signal frequency offset; and
 the estimated carrier signal frequency offset is less than 2 GHz.

20. The wavelength-division multiplexed system of claim 8 wherein the process information comprises an estimated accumulated chromatic dispersion.

21. The wavelength-division multiplexed system of claim 8 wherein the process information comprises demodulated symbol information.

22. The wavelength-division multiplexed system of claim 8 wherein the process information comprises firmly decided upon information.

23. The wavelength-division multiplexed system of claim 8, wherein:
 the process information comprises soft information; and
 the soft information is selected from the group consisting of: likelihood values, ratios, linear estimates of likelihood values, linear estimates of ratios, logarithmic representations of likelihood values, and logarithmic representations of ratios.

24. The frequency-division multiplexed system of claim 16 wherein the process information comprises an estimated carrier signal phase offset, and wherein
 the estimated carrier signal phase offset is from 0 to $2\pi$ radians.

25. The frequency-division multiplexed system of claim 16 wherein the process information comprises an estimated carrier signal frequency offset, and wherein the estimated carrier signal frequency offset is less than 2 GHz.

26. The frequency-division multiplexed system of claim 16 wherein the process information comprises demodulated symbol information.

27. The frequency-division multiplexed system of claim 16 wherein the process information comprises firmly decided upon information.

28. The frequency-division multiplexed system of claim 16 wherein the process information comprises soft information, and wherein the soft information is selected from the group consisting of: likelihood values, ratios, linear estimates of likelihood values, linear estimates of ratios, logarithmic representations of likelihood values, and logarithmic representations of ratios.

* * * * *